United States Patent
Jaiswal et al.

(10) Patent No.: US 9,692,648 B2
(45) Date of Patent: *Jun. 27, 2017

(54) DYNAMICALLY MANAGING A SYSTEM OF SERVERS

(71) Applicant: International Business Machines Corporation, Armonk, NY (US)

(72) Inventors: Peeyush Jaiswal, Boca Raton, FL (US); Naveen Narayan, Flower Mound, TX (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,959

(22) Filed: Mar. 21, 2016

(65) Prior Publication Data

US 2016/0204981 A1    Jul. 14, 2016

Related U.S. Application Data

(63) Continuation of application No. 11/839,805, filed on Aug. 16, 2007, now Pat. No. 9,300,486.

(51) Int. Cl.
*G06F 15/173* (2006.01)
*H04L 12/24* (2006.01)

(52) U.S. Cl.
CPC ............ *H04L 41/082* (2013.01); *H04L 12/24* (2013.01); *H04L 41/00* (2013.01); *H04L 41/04* (2013.01)

(58) Field of Classification Search
None
See application file for complete search history.

(56) References Cited

U.S. PATENT DOCUMENTS

| 2004/0024852 A1 | 2/2004 | Chen et al. |
| 2008/0201724 A1 | 8/2008 | Endrikhovski et al. |
| 2009/0049136 A1 | 2/2009 | Jaiswal et al. |

OTHER PUBLICATIONS

Notice of Allowance (Dec. 9, 2015) for U.S. Appl. No. 11/839,805, filed Aug. 26, 2007.
Advisory Action (Oct. 8, 2015) for U.S. Appl. No. 11/839,805, filed Aug. 26, 2007.
Final Amendment (Sep. 4, 2015) for U.S. Appl. No. 11/839,805, filed Aug. 26, 2007.

(Continued)

*Primary Examiner* — Scott B Christensen
(74) *Attorney, Agent, or Firm* — Schmeiser, Olsen & Watts, LLP; John R. Pivnichny (57) ABSTRACT

A method and system for managing servers. A message received by a first server specifies multiple servers to be updated via an update. The message identifies a server type of each specified server, an old server name of each specified server prior to the update, and a corresponding new server name of each specified server after the update. First servers of the multiple servers are identified based on the first server being a consumer of services provided by a server type corresponding to each specified server of the first servers. Second servers that have a corresponding old server name within a local configuration of the first server are identified. For each server of the second servers, local configuration changes are scheduled to update the corresponding old server names with corresponding new server names at corresponding specified times. Each corresponding old server name is replaced with corresponding new server names.

15 Claims, 6 Drawing Sheets

(56) References Cited

OTHER PUBLICATIONS

Final Office Action (Jul. 7, 2015) for U.S. Appl. No. 11/839,805, filed Aug. 26, 2007.
Amendment (Jun. 12, 2015) for U.S. Appl. No. 11/839,805, filed Aug. 26, 2007.
Office Action (Mar. 12, 2015) for U.S. Appl. No. 11/839,805, filed Aug. 26, 2007.
RCE (Nov. 25, 2014) for U.S. Appl. No. 11/839,805, filed Aug. 26, 2007.
Examiner's Answer (Oct. 27, 2011) for U.S. Appl. No. 11/839,805, filed Aug. 26, 2007.
Appeal Brief (Jun. 29, 2011) for U.S. Appl. No. 11/839,805, filed Aug. 26, 2007.
Appeal Brief (Jun. 1, 2011) for U.S. Appl. No. 11/839,805, filed Aug. 26, 2007.
Notice of Appeal (Apr. 1, 2011) for U.S. Appl. No. 11/839,805, filed Aug. 26, 2007.
Final Office Action (Jan. 6, 2011) for U.S. Appl. No. 11/839,805, filed Aug. 26, 2007.
Amendment (Oct. 18, 2010) for U.S. Appl. No. 11/839,805, filed Aug. 26, 2007.
Office Action (Jul. 20, 2010) for U.S. Appl. No. 11/839,805, filed Aug. 26, 2007.
Appeal Brief (May 4, 2010) for U.S. Appl. No. 11/839,805, filed Aug. 26, 2007.
Notice of Appeal (Mar. 5, 2010) for U.S. Appl. No. 11/839,805, filed Aug. 26, 2007.
Final Office Action (Jan. 19, 2010) for U.S. Appl. No. 11/839,805, filed Aug. 26, 2007.
Amendment (Sep. 23, 2009) for U.S. Appl. No. 11/839,805, filed Aug. 26, 2007.
Office Action (Jun. 23, 2009) for U.S. Appl. No. 11/839,805, filed Aug. 26, 2007.

```
<controlInfo>
     <NumPacketsThatWillBeBroadcasted>XX<NumPacketsThatWillBeBroadcasted>
     <BroadcastStopTime>TT<BroadcastStopTime>
     <BroadcastInterval>BI<BroadcastInterval>
<controlInfo>
```
— 203

```
<ServerType_1>
     <OldHostName>HN1<OldHostName>
     <NewHostName>HN2<NewHostName>
     <NewHostAvailableTime>TS<NewHostAvailableTime>

<OldHostName>HN11<OldHostName>
     <NewHostName>HN22<NewHostName>
     <NewHostAvailableTime>TS<NewHostAvailableTime>

<OldHostName>HN111<OldHostName>
     <NewHostName>HN222<NewHostName>
     <NewHostAvailableTime>TS<NewHostAvailableTime>
<ServerType_1>
```
— 205a

```
<ServerType_2>
     <OldHostName>HN13<OldHostName>
     <NewHostName>HN23<NewHostName>
     <NewHostAvailableTime>TS<NewHostAvailableTime>
<ServerType_2>
```
— 205b

DYNAMICALLY MANAGING A SYSTEM OF SERVERS

This application is a continuation application claiming priority to Ser. No. 11/839,805, filed Aug. 16, 2007, now U.S. Pat. No. 9,300,486, issued Mar. 29, 2016.

BACKGROUND OF THE INVENTION

1. Technical Field

The present invention relates generally to the field of managing systems of servers, such as server farms, and more particularly to a method of and system for dynamically removing, replacing or upgrading servers in a system of servers.

2. Description of the Related Art

As interactive voice response (IVR) products mature from a traditional client/server environment to a more Web-centric architecture, an increasing number of service providers resort to having a managed data center provide IVR services. Managing a Web-based IVR farm of servers includes managing IVR servers, Web servers, and speech recognition servers. As part of management, administrators typically have to upgrade hardware. Examples of such hardware upgrades include adding dialogic cards, adding more disk space, and adding more memory. These changes are generally not dynamic and removing a server from a network and adding a new one is not an automated process. Removing a server from a network or adding a new one requires careful timing and planning.

SUMMARY OF THE INVENTION

The present invention provides a method and a system for managing a plurality of servers coupled to a network. Each of the servers is identified by a server name. At least one of the servers is identified by an old server name. The method of the present invention notifies at least some of the plurality of servers that at a specified time the old server name will be changed to a new server name. In some embodiments of the present invention, the new server name may be the name of one of the plurality of servers already connected to the network. In other embodiments, the new server name may be the name of a new server added to the network.

The system according to the present invention includes an administration server coupled to the network and administration clients installed on the plurality of servers. The administration server is configured to broadcast on the network update messages. An update message includes the old server name, the new server name, and the specified time at which the old server name will be changed to the new server name. Each of the plurality of servers includes a local configuration that identifies the servers with which the particular server communicates. When an administration client receives an update message, the administration client determines if the local configuration of the server upon which the client is installed includes the old server name. If so, the administration client initiates a change of the old server name to the new server name in the local configuration file at the specified time.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
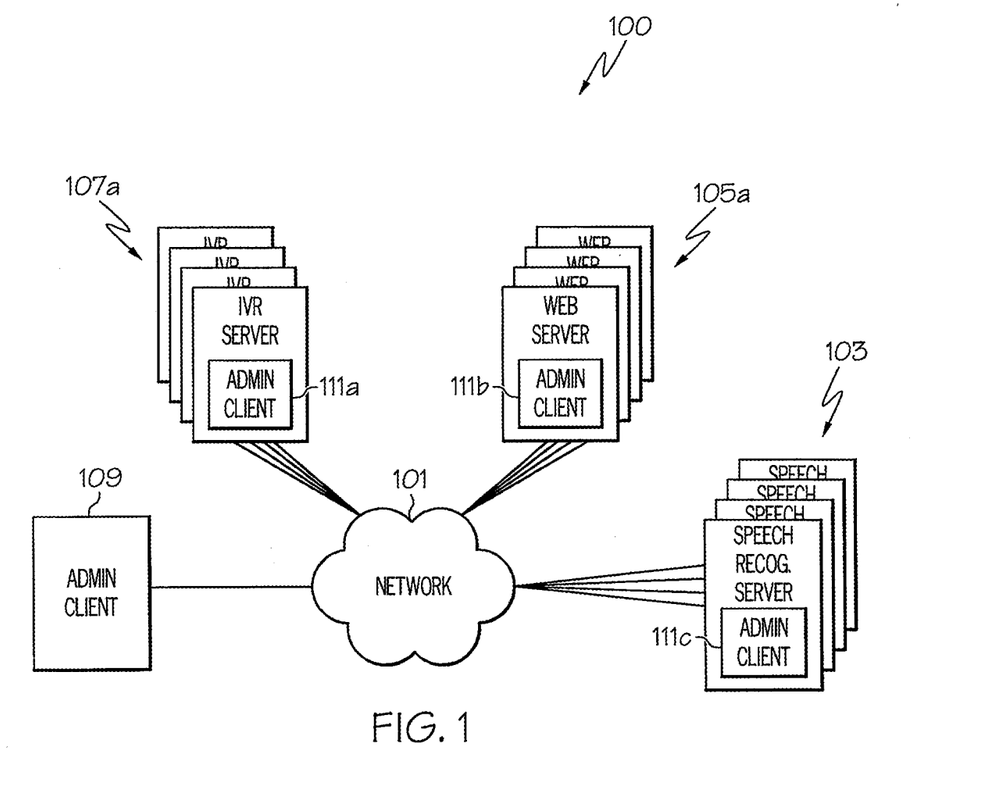
FIG. 1 is a block diagram of an embodiment of an interactive voice response (IVR) platform according to the present invention.

Referring now to the drawings, and first to FIG. 1, a system according to the present invention is designated generally by the numeral 100. In the illustrated embodiment, system 100 is a Web-based interactive voice response (IVR) server farm. System 100 includes a plurality of servers coupled to a network 101. Network 101 may be a local area network (LAN), a wide area network (WAN), the Internet, or any other network. The servers of system 100 include a plurality of speech recognition servers 103, a plurality of Web servers 105, and a plurality of IVR servers 107. As is known to those skilled in the art, the various servers cooperate with each other to perform automated interactive voice response services.

System 100 includes an administration server 109 coupled to network 101. As will be explained in detail hereinafter, administration server 109 is programmed according to embodiments of the present invention to facilitate dynamically removing, replacing, or upgrading the servers of system 100. According to the present invention, each server 103-107 includes an administration client 111. Each administration client 111 is programmed according to embodiments of the present invention to process and act on update messages from administration server 109.

Figure 2:
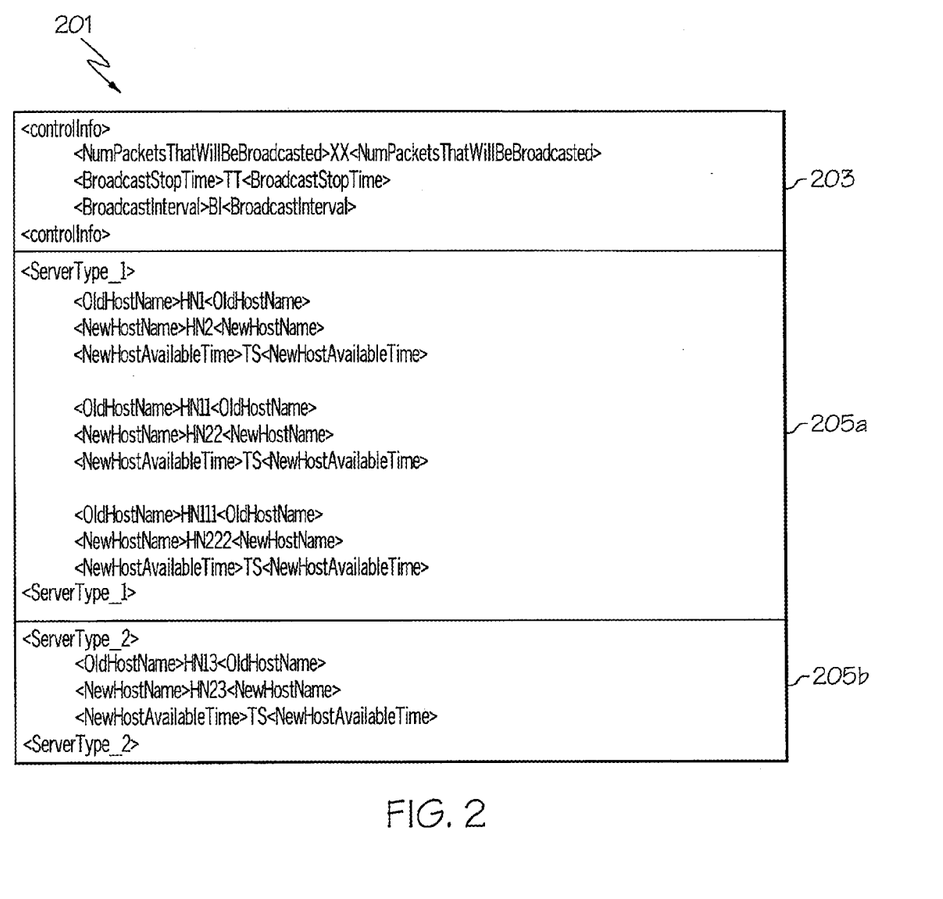
FIG. 2 is an illustration of a message packet according to an embodiment of the present invention.

FIG. 2 illustrates an example of an update message package 201 according to the present invention. Update message packet includes a header 203, which contains control information. The body portion 205 of update message packet is segregated by ServerType. ServerType may have values like IVR, WEB, and RECO. Different servers 103-107 of system 100 are consumers of different services. For example, IVR servers 107 may be consumers of services provided by speech recognition servers 103 and Web servers 105. However, speech recognition servers 103 are not consumers of the services provided by Web servers 105. Also, the system of servers may be configured such that certain IVR servers are consumers of services provided by some Web servers or speech recognition servers, but not others. Service type enables an administration client 111 to determine whether it needs to be concerned with server name changes for particular servers. Within each server type of update message packet 201 there is listed the servers of that type that will be removed, replaced, or upgraded. According to an embodiment of a messaging protocol according to the present invention, the server to be taken out of service is identified as OldHostName. The server that will replace OldHostName is identified as NewHostName. The time at which the change will occur is identified as NewHostAvailableTime.

Figure 3:
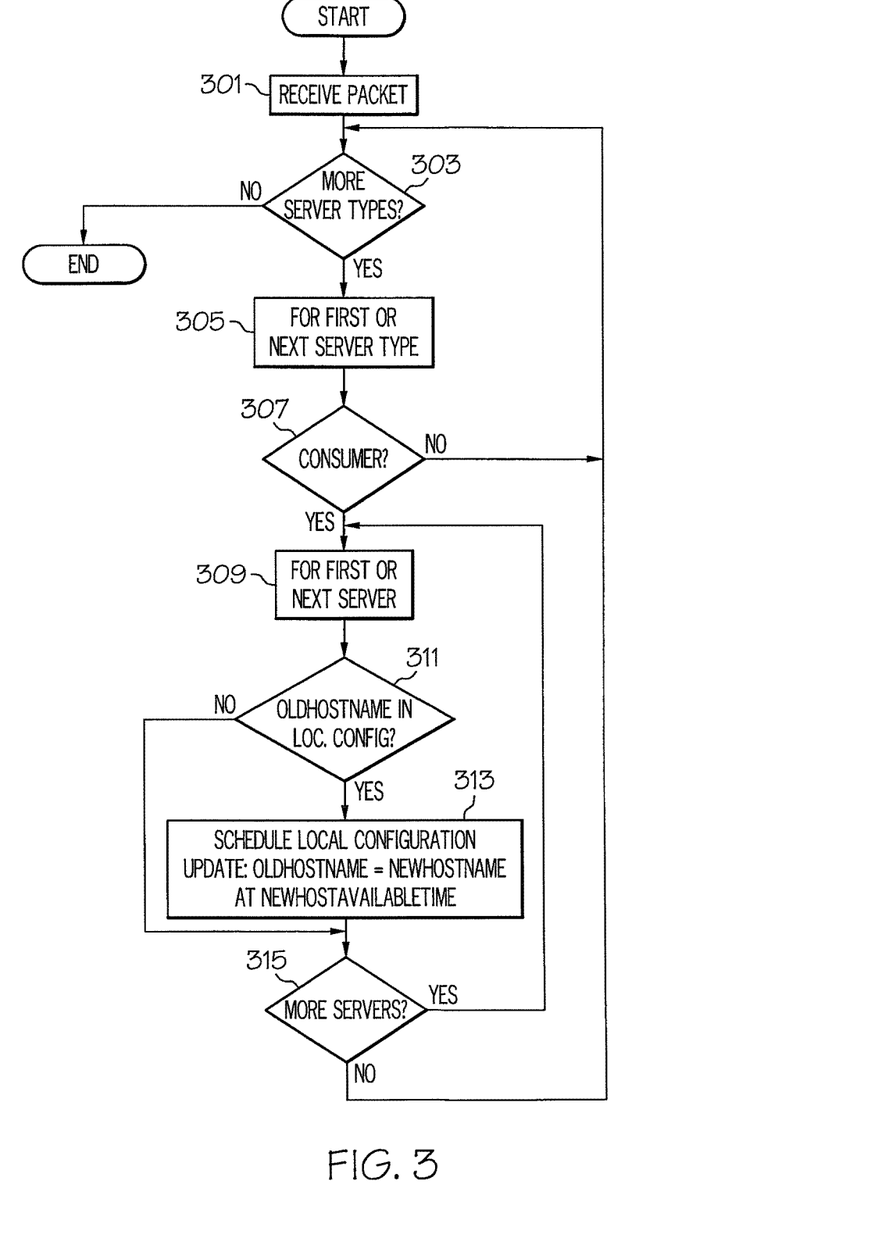
FIG. 3 is a flow chart of server name change processing according to an embodiment of the present invention; and, FIG. 4 is a block diagram of an IVR platform before a first implementation of server update according to an embodiment of the present invention.

FIG. 3 is a flow chart of an embodiment of administration client processing according to the present invention. The administration client receives a packet, at block 301. The administration client parses the packet and determines, at decision block 303, if there are any more ServerTypes. If not, as indicated at block 305 and at decision block 307, the administration client determines, for the first or next ServerType in the packet if the server upon which it is installed is a consumer of services provided by that ServerType. If not, processing returns to decision block 303. If as determined at decision block 307, the server is a consumer of services provided by that ServerType, the administration client determines, for the first or next server within that ServerType if the OldHostName is in the local configuration of the server upon which it is installed, as indicated at block 309 and decision block 311. If so, the administration client schedules a local configuration update for the server upon which is installed to change OldHostName to NewHostName at the NewHostAvailableTime, as indicated at block 313. If, as determined at decision block 315, there are more servers within the ServerType, processing returns to block 309. If not, processing returns to decision block 303. Processing continues according to FIG. 3 until there are no more ServerTypes. At the NewHostAvailableTime scheduled, the administration client changes the OldHostName to the NewHostName in the local configuration of the server upon which is installed. Thereafter, whenever the server requires services that it would have received from the OldHostName it will receive the services of the NewHostName.

Figure 4:
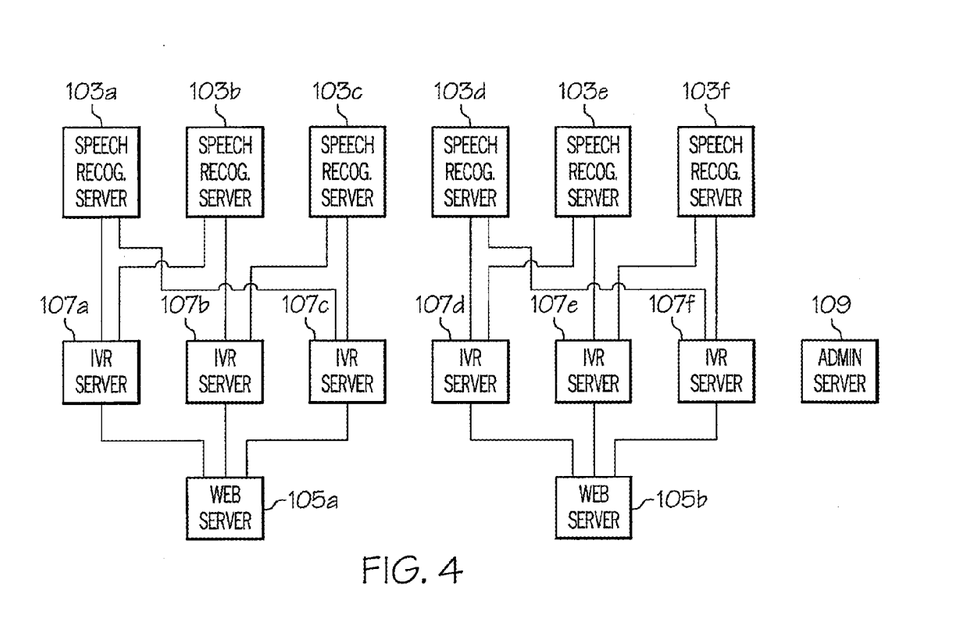
Figure 5:
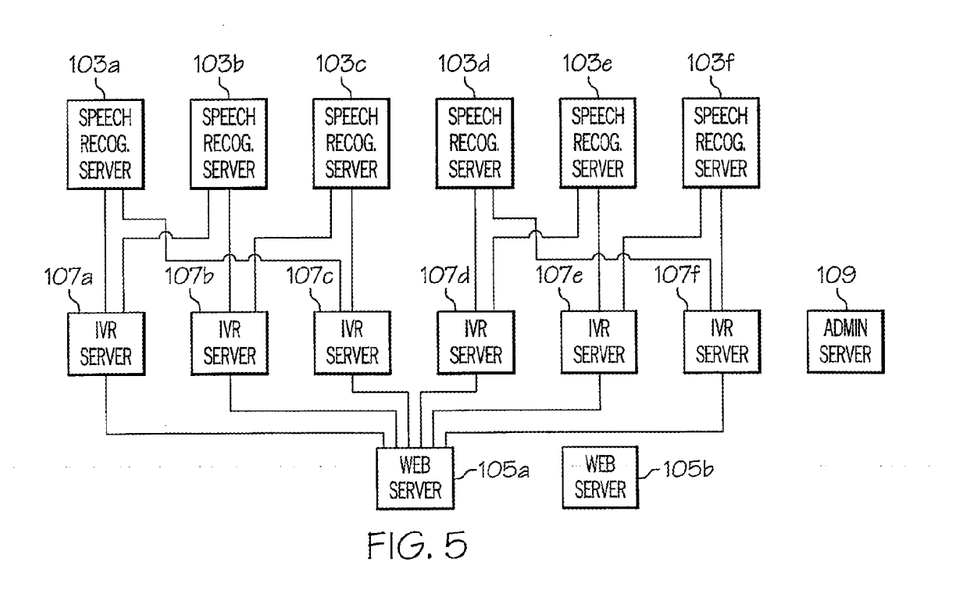
FIG. 5 is a block diagram of the IVR platform of FIG. 4 after server update according to an embodiment of the present invention.

FIG. 4 and FIG. 5 illustrate an example of the operation of the present invention in which one server will be replaced by an existing server. In FIGS. 4 and 5, speech recognition servers 103, IVR servers 107, Web servers 105, and administration server 109 are all networked together. However, the actual communication channels between servers 103-107 within the network are indicated by solid lines. Thus, IVR server 107a speech recognition servers communicate speech recognition servers 103a and 103b, but not with speech recognition servers 103c-103f. Similarly, Web server 105a communicates with IVR servers 107a-107c, but not with IVR servers 107d-107f. Administration server 109 communicates with each server 103-107. However, lines indicating communication channels have been omitted for the sake of clarity.

In the example of FIGS. 4 and 5, administration server 109 would broadcast an update message packet including, in addition to a header, the following information.
<ServerType_WEB>
<OldHostName>105b<OldHostName>
<OldHostName>105a<OldHostName>
<NewHostAvailableTime>TS<NewHostAvailableTime>
<ServerType_WEB>
Since IVR servers 107d-107f communicate with Web server 105b, the administration clients installed on those IVR servers would schedule a change of hostname 105b to hostname 105a at time TS. At time TS, the system of servers would assume the configuration shown in FIG. 5. Thereafter, old Web server 105 could be taken off the network.

Figure 6:
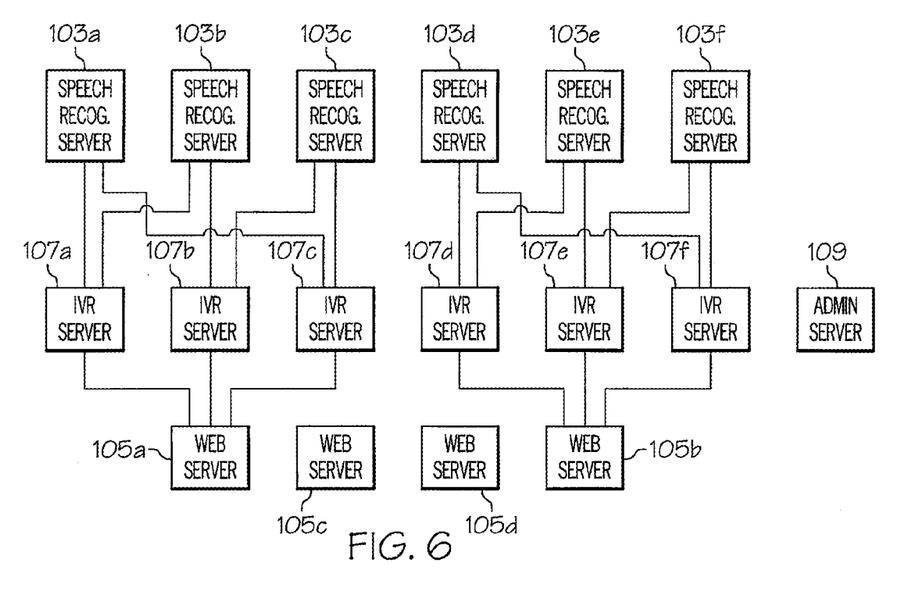
FIG. 6 is a block diagram of an IVR platform before a second implementation of server update according to an embodiment of the present invention.
Figure 7:
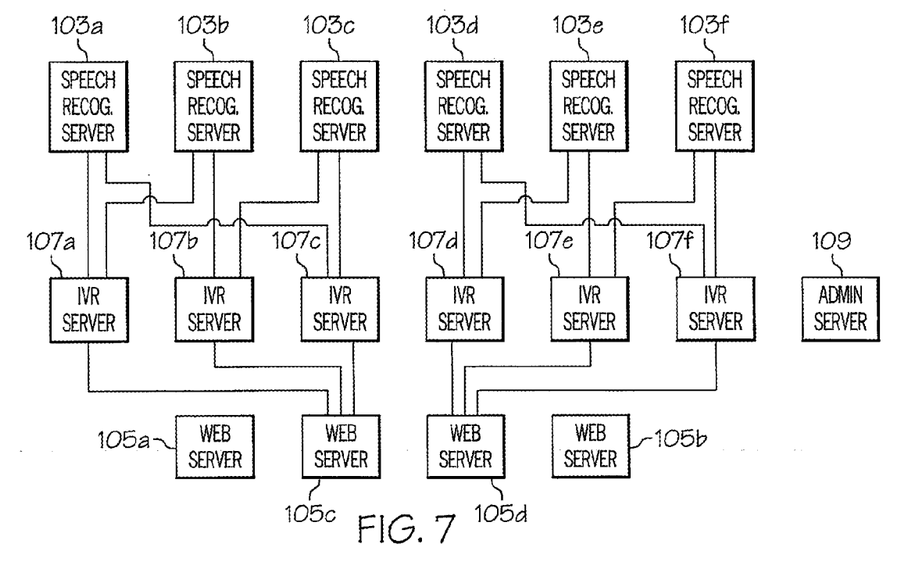
FIG. 7 is a block diagram of the IVR platform of FIG. 6 after server update according to an embodiment of the present invention.

FIG. 6 and FIG. 7 illustrate an example of the operation of the present invention in which Web servers 105a and 105b are replaced by new Web servers 105c and 105d, respectively, which were not previously part of the system of servers 103-107. In the example of FIGS. 6 and 7, administration server 109 would broadcast an update message packet including, in addition to a header, the following information.
<ServerType_WEB>
<OldHostName>105a<OldHostName>
<OldHostName>105c<OldHostName>
<NewHostAvailableTime>TS<NewHostAvailableTime>
<OldHostName>105b<OldHostName>
<OldHostName>105d<OldHostName>
<NewHostAvailableTime>TS<NewHostAvailablableTime>
<ServerType_WEB>
Since IVR servers 107a-107c communicate with old Web server 105a, the administration clients installed on those IVR servers would schedule a change of hostname 105c to hostname 105c at time TS. Similarly, since IVR servers 107d-107f communicate with old Web server 105b, the administration clients installed on those IVR servers would schedule a change of hostname 105b to hostname 105d at time TS Prior to time TS, new Web servers 105c and 105d would be connected to the network. At time IS, the system of servers would assume the configuration shown in FIG. 7. Thereafter, old Web server 105b is could be taken off the network.

Figure 8:
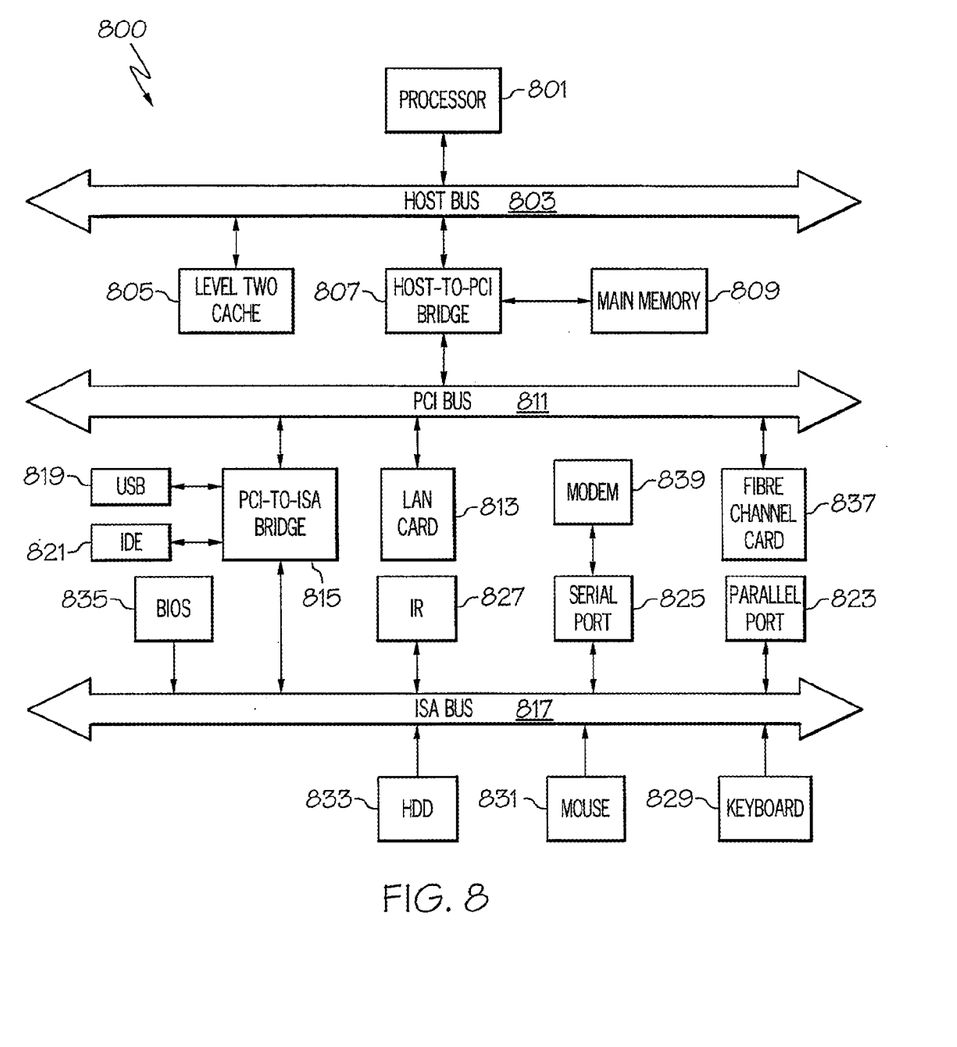
FIG. 8 is a block diagram of an information handling system adapted to embody systems and methods according to the present invention.

Referring now to FIG. 8, there is illustrated a block diagram of a generic information handling system 800 capable of performing the server and client operations described herein. Computer system 800 includes processor 801 which is coupled to host bus 803. Processor 801 preferably includes an onboard cache memory. A level two (L2) cache memory 805 is also coupled to host bus 803. A Host-to-PCI bridge 807 is coupled to host bus 803. Host-to-PCI bridge 807, which is coupled to main memory 809, includes its own cache memory and main memory control functions. Host-to-PCI bridge 807 provides bus control to handle transfers among a PCI bus 811, processor 801, L2 cache 805, main memory 809, and host bus 803, PCI bus 811 provides an interface for a variety of devices including, for example, a local area network (LAN) card 813, a PCI-to-ISA bridge 815, which provides bus control to handle transfers between PCI bus 811 and an ISA bus 817, a universal serial bus (USB) 819, and an IDE device 821. PCI-to-ISA bridge 815 also includes onboard power management functionality. PCI-to-ISA bridge 815 can include other functional elements not shown, such as a real-time clock (RTC), DMA control, interrupt support, and system management bus support.

Peripheral devices and input/output (I/O) devices can be attached to various interfaces or ports coupled to ISA bus 817. Such interfaces or ports may include a parallel port 823, a serial port 825, an infrared (IR) interface 827, a keyboard interface 829, a mouse interface 831, and a hard disk drive (HDD) 833.

A BIOS 835 is coupled to ISA bus 817. BIOS 835 incorporates the necessary processor executable code for a variety of low-level system functions and system boot functions. BIOS 835 can be stored in any computer readable medium, including magnetic storage media, optical storage media, flash memory, random access memory, read only memory, and communications media conveying signals encoding the instructions (e.g., signals from a network). In order to couple computer system 800 to another computer system to copy files or send and receive messages over a network, LAN card 813 may be coupled to PCI bus 811. Similarly, a Fibre Channel card may be coupled to PCI bus 813. Additionally, a modem 839 may be coupled to ISA bus 817 through serial port 825 to support dial-up connections.

While the computer system described in FIG. 8 is capable of executing the invention described herein, the illustrated system is simply one example of a computer system. Those skilled in the art will appreciate that many other computer system designs are capable of performing the invention described herein.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CI) ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method for managing servers, said method comprising:
receiving, by a first server, a message specifying a plurality of servers to be updated in accordance with an update, the message identifying a server type of each specified server of the plurality of servers, wherein, for each specified server, the message identifies a corresponding old server name of the specified server prior to the update and a corresponding new server name of the specified server after the update, said plurality of servers being coupled to a network;
identifying, by the first server, a first plurality of servers of the plurality of servers based on the first server being a consumer of services provided by a server type corresponding to each specified server of the first plurality of servers;
determining, by the first server from the first plurality of servers, a second plurality of servers that have a corresponding old server name within a local configuration of the first server;
for each server of the second plurality of servers, scheduling, by the first server, local configuration changes to update the corresponding old server names with corresponding new server names at corresponding specified times; and
responsive to removing old servers of the second plurality of servers from the network after one specified time of the corresponding specified times and replacing the removed old servers with corresponding new servers, replacing, by the first server and based on the scheduled local configuration changes, each corresponding old server name with corresponding new server names.

2. The method of claim 1, wherein one new server name of the corresponding new server names is a name of one server of the plurality of servers.

3. The method of claim 1, wherein one new server name of the corresponding new server names is a name of a new server added to the network.

4. The method of claim 3, said method further comprising:
adding the new server to the network before one specified time of the corresponding specified times.

5. The method of claim 1, said method further comprising:
removing the old servers of the second plurality of servers from the network after the one specified time of the corresponding specified times.

6. A computer system, comprising a processor, a memory coupled to the processor, and a computer readable hardware storage device coupled to the processor, said storage device containing program code executable by the processor via the memory to implement a method for managing servers, said method comprising:
receiving, by a first server, a message specifying a plurality of servers to be updated in accordance with an update, the message identifying a server type of each specified server of the plurality of servers, wherein, for each specified server, the message identifies a corresponding old server name of the specified server prior to the update and a corresponding new server name of the specified server after the update, said plurality of servers being coupled to a network;
identifying, by the first server, a first plurality of servers of the plurality of servers based on the first server being a consumer of services provided by a server type corresponding to each specified server of the first plurality of servers;
determining, by the first server from the first plurality of servers, a second plurality of servers that have a corresponding old server name within a local configuration of the first server;
for each server of the second plurality of servers, scheduling, by the first server, local configuration changes to update the corresponding old server names with corresponding new server names at corresponding specified times; and
responsive to removing old servers of the second plurality of servers from the network after one specified time of the corresponding specified times and replacing the removed old servers with corresponding new servers, replacing, by the first server and based on the scheduled local configuration changes, each corresponding old server name with corresponding new server names.

7. The computer system of claim 6, wherein one new server name of the corresponding new server names is a name of one server of the plurality of servers.

8. The computer system of claim 6, wherein one new server name of the corresponding new server names is a name of a new server added to the network.

9. The computer system of claim 8, said method further comprising:
adding the new server to the network before one specified time of the corresponding specified times.

10. The computer system of claim 6, said method further comprising:

removing the old servers of the second plurality of servers from the network after the one specified time of the corresponding specified times.

11. An article of manufacture, comprising a computer readable hardware storage device having computer readable program code stored therein, said program code executable by a processor of a computer system to implement a method for managing servers, said method comprising:

receiving, by a first server, a message specifying a plurality of servers to be updated in accordance with an update, the message identifying a server type of each specified server of the plurality of servers, wherein, for each specified server, the message identifies a corresponding old server name of the specified server prior to the update and a corresponding new server name of the specified server after the update, said plurality of servers being coupled to a network;

identifying, by the first server, a first plurality of servers of the plurality of servers based on the first server being a consumer of services provided by a server type corresponding to each specified server of the first plurality of servers;

determining, by the first server from the first plurality of servers, a second plurality of servers that have a corresponding old server name within a local configuration of the first server;

for each server of the second plurality of servers, scheduling, by the first server, local configuration changes to update the corresponding old server names with corresponding new server names at corresponding specified times; and responsive to removing old servers of the second plurality of servers from the network after one specified time of the corresponding specified times and replacing the removed old servers with corresponding new servers, replacing, by the first server and based on the scheduled local configuration changes, each corresponding old server name with corresponding new server names.

12. The article of manufacture of claim 1, wherein one new server name of the corresponding new server names is a name of one server of the plurality of servers.

13. The article of manufacture of claim 11, wherein one new server name of the corresponding new server names is a name of a new server added to the network.

14. The article of manufacture of claim 13, said method further comprising:

adding the new server to the network before one specified time of the corresponding specified times.

15. The article of manufacture of claim 11, said method further comprising:

removing the old servers of the second plurality of servers from the network after the one specified time of the corresponding specified times.

\* \* \* \* \*